(12) United States Patent
van Amsterdam et al.

(10) Patent No.: US 11,992,809 B2
(45) Date of Patent: May 28, 2024

(54) DEVICE FOR SEPARATING COMPONENTS OF A GAS MIXTURE

(71) Applicants: Albert van Amsterdam, Ossendrecht (NL); Hylke Sijbesma, Dordrecht (NL)

(72) Inventors: Albert van Amsterdam, Ossendrecht (NL); Hylke Sijbesma, Dordrecht (NL)

(73) Assignee: Parker Hannifin Manufacturing Netherlands(Filtration and Separation), Etten Leur (NL)

( * ) Notice: Subject to any disclaimer, the term of this patent is extended or adjusted under 35 U.S.C. 154(b) by 59 days.

(21) Appl. No.: 17/324,314

(22) Filed: May 19, 2021

(65) Prior Publication Data

US 2021/0268429 A1  Sep. 2, 2021

Related U.S. Application Data

(63) Continuation of application No. PCT/EP2019/081793, filed on Nov. 19, 2019.

(51) Int. Cl.
*B01D 53/22* (2006.01)
*B01D 63/02* (2006.01)
*B01D 71/52* (2006.01)

(52) U.S. Cl.
CPC .............. *B01D 63/02* (2013.01); *B01D 53/22* (2013.01); *B01D 71/5223* (2022.08);
(Continued)

(58) Field of Classification Search
None
See application file for complete search history.

(56) References Cited

U.S. PATENT DOCUMENTS 4,865,736 A * 9/1989 Coplan ................ B01D 63/10
210/450
6,755,894 B2 6/2004 Bikson
(Continued)

FOREIGN PATENT DOCUMENTS

EP  0226431 A2  6/1987
EP  0669158 A1  8/1995
(Continued)

OTHER PUBLICATIONS

Search Report dated Jun. 3, 2019 for UK Application No. GB1818934.0.
(Continued)

*Primary Examiner* — Jason M Greene
(74) *Attorney, Agent, or Firm* — Christopher H. Hunter

(57) ABSTRACT

A device for separating components of a gas mixture includes a hollow housing having a body portion at a first end, a separable end cap at a second end, and at least one side wall. The housing has an inlet port for the gas mixture, a permeate outlet port for gas mixture enriched with a first component of the mixture, and a retentate outlet port for gas mixture enriched with a second component of the mixture. An insert within the housing comprises a plurality of hollow fibres of a material which are more permeable to the first component than the second. The housing defines passageways for gas to flow between the inlet port and the permeate and retentate outlet ports. The insert is fastened to the end cap at least temporarily so that the insert is withdrawn from within the housing when the end cap is removed.

30 Claims, 5 Drawing Sheets

Figure 1:
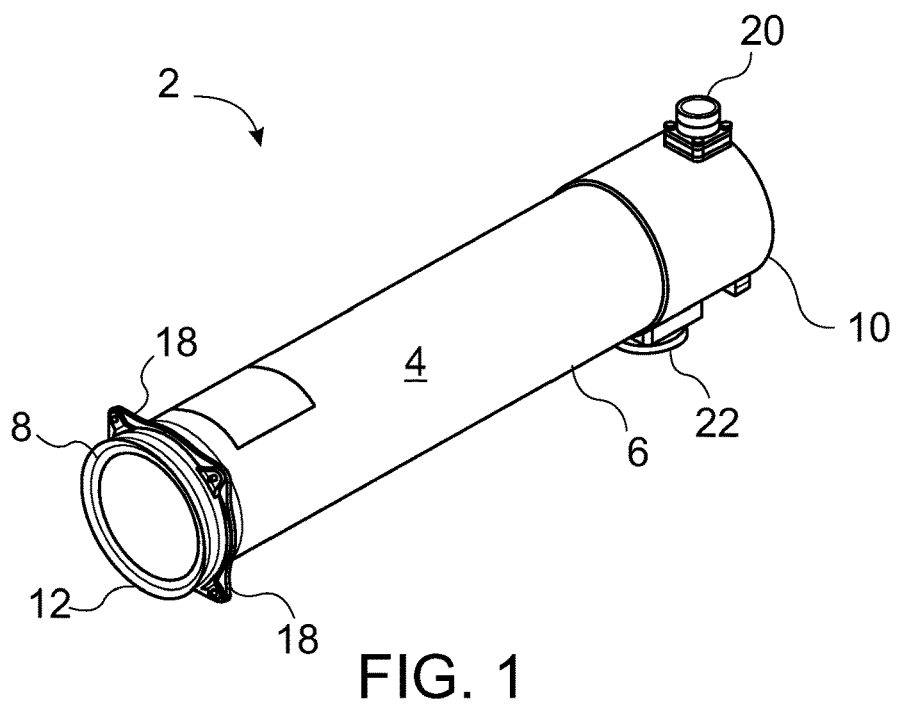

(52) U.S. Cl.
CPC .... *B01D 2053/224* (2013.01); *B01D 2256/10* (2013.01); *B01D 2256/12* (2013.01); *B01D 2257/102* (2013.01); *B01D 2257/104* (2013.01)

(56) References Cited

U.S. PATENT DOCUMENTS

| | | | |
|---|---|---|---|
| 6,776,820 | B2 | 8/2004 | Bikson |
| 9,340,297 | B2 | 5/2016 | Cao |
| 9,623,369 | B2 | 4/2017 | Bikson |
| 9,718,023 | B2 | 8/2017 | Kanetsuki |
| 2002/0162455 | A1* | 11/2002 | Bikson ............... B01D 53/22 96/8 |
| 2012/0304856 | A1* | 12/2012 | Kanetsuki ........... B01D 53/228 95/47 |

FOREIGN PATENT DOCUMENTS

| | | |
|---|---|---|
| EP | 1275432 A1 | 1/2003 |
| EP | 1374974 A2 | 1/2004 |
| JP | 2009 289580 A | 12/2009 |
| KR | 20180049598 A | 5/2018 |
| WO | 94/17902 | 8/1994 |
| WO | 01/66231 A1 | 9/2001 |
| WO | 2020/104453 A1 | 5/2020 |

OTHER PUBLICATIONS

International Search Report and Written Opinion dated Jan. 15, 2020 for International Application PCT/EP2019/081793.
Communication Pursuant to Article 94(3) for EP 19805961.0 dated Sep. 26, 2022.
Response to Communication Pursuant to Article 94(3) for EP 19805961.0 dated Sep. 26, 2022; filed Dec. 1, 2022.
Communication Pursuant to Article 94(3) for EP 19805961.0 dated Sep. 28, 2023.
Marcos Da Conceicao et al., Gas Separation Membrane Module Modeling: A Comprehensive Review, Membranes 2023, 13, 639. https://doi.org/10.3390/membranes 13070639.

* cited by examiner

DEVICE FOR SEPARATING COMPONENTS OF A GAS MIXTURE

This application is a continuation of International Application No. PCT/EP2019/081793, filed Nov. 19, 2019, and which designated the United States; and which claims priority to Great Britain Application No. 1818934.0 filed Nov. 21, 2018, the disclosures of which are incorporated herein by reference.

This invention relates to a device for separating components of a gas mixture.

It might be desirable to separate components of a gas mixture because one component of the mixture confers undesirable properties on the mixture. It might also be desirable to separate components of a mixture if different components of the mixture are useful for different applications. An example of a device for separating components of a gas mixture is an air separator which is used to separate oxygen and nitrogen, generating oxygen enriched air and nitrogen enriched air.

U.S. Pat. No. 9,340,297 discloses an air separation module which includes a housing and a gas separation membrane within the housing. The gas separation membrane comprises a bundle of hollow fibre membranes, each fibre membrane having a wall of a permeable, porous material. A gas mixture supplied to the disclosed module flows along a central support tube from a feed port at one end of the housing to a header region at the opposite other end. The gas mixture then flows through the fibres of the gas separation membrane from the header region to a retentate port located at the same end of the housing as the feed port. Permeate gases which pass through the walls of the fibres flow out of the module through a permeate port in the wall of the housing towards the opposite end.

GB-A-2533585 discloses fuel tank inserting systems. In such systems, a gas comprising oxygen (typically air taken from an engine bleed and then cooled) is passed through a gas separating material which removes at least some of the oxygen from the gas stream. Modules comprising such gas separating materials are available from Parker Filtration & Separation BV, Etten-Leur, Netherlands under the trade marks SmartFluxx and HiFluxx. The oxygen depleted gas stream is then fed to a fuel tank. Similar gas separation modules are also used to provide gas with increased oxygen content. Such modules can also be used to supply oxygen-enhanced air to patients for example. Gas separation in such modules effectively results in removal of nitrogen from inlet air, thereby providing an outlet gas with an enhanced oxygen content.

The separation efficiency of a gas separation membrane can deteriorate with use. It is common practice to replace a separation module, including the housing and the membrane within it, after a period of use in order to maintain a desired separation efficiency.

The present invention provides a device for separating components of a gas mixture, in which the housing has a body portion and an end cap, and in which an insert comprising a plurality of hollow fibres is fastened to the end cap at least temporarily so that the insert is withdrawn from within the body portion when the end cap is separated from the body portion.

The invention therefore provides a device for separating components of a gas mixture which comprises:

a. a hollow housing having a first end wall at a first end, a second end wall at a second end opposite to the first end, and at least one side wall, in which the housing has a body portion which provides the first end, and an end cap which provides the second end and can be separated from the body portion to allow access to the interior of the body portion, and in which the housing has (a) an inlet port for the gas mixture, (b) a permeate outlet port for gas mixture which is enriched with a first component of the mixture, and (c) a retentate outlet port for gas mixture which is enriched with a second component of the mixture, and the inlet port and the retentate outlet port are provided in the body portion of the housing, b. an insert located within the housing, comprising a plurality of hollow fibres made from a material which is more permeable to the first component of the mixture than it is to the second component of the mixture, in which the fibres extend along the insert between its first and second ends, in which the housing defines a space at its first end which communicates with the ends of the fibres at the first end, and the insert defines at least one passageway for gas to flow between the ends of the fibres at the second end and the retentate outlet port for the gas mixture to flow from the space to the retentate outlet port, and in which the insert is fastened to the end cap at least temporarily so that the insert is withdrawn from within the body portion of the housing when the end cap is separated from the body portion.

The device can be serviced efficiently by separating the end cap from the body portion of the housing, so that the insert is withdrawn from the body portion for replacement. A temporary fastening between the end cap and the insert allows the insert to be unfastened from the end cap and replaced, prior to re-assembling the end cap and the body portion to form the housing. The end cap can effectively be used as a tool to facilitate removal or insertion of both of the insert. The end cap might be replaced with the insert when the end cap cannot readily be separated from the insert.

The provision of at least the inlet port and the retentate outlet port, and preferably also the permeate outlet port, in the body portion of the housing has the advantage that an insert can be removed from the housing without any requirement to disturb the connections between the device and the conduits for the untreated gas mixture, the retentate output gas, and optionally also the permeate output gas.

The device can therefore be serviced by replacement of the insert within the housing when the device is in a location in which access is limited. In particular, access to the device might be restricted so that it is only possible to access the end cap portion of the housing to allow the end cap to be detached from the body portion. This can be an advantage when the device is located close to other equipment.

Factors which might affect the arrangement of the inlet port and the retentate outlet port on the body portion of the housing can include the configuration of the insert and the arrangement of connections to conduits for the untreated gas mixture and the retentate output gas. At least one of the inlet port and the retentate outlet port can be provided on the first end wall of the body portion. One of the inlet ports and the retentate outlet port can be provided centrally on the first end wall of the housing. This can be convenient when the passageway defined by the insert extends along a central axis of the housing. A central port on the first end wall of the housing can then be connected to the passageway for flow of fluid through the port and the passageway (although the port with which the passageway communicates might be on a side wall of the housing).

When gas is caused to flow between the said space and the retentate outlet port, the gas may have been enriched with the second component. The gas mixture may pass along the hollow fibres (where it is enriched with the second component) and into the passageway before flowing to the retentate outlet. Thus, gas flowing into the passageway may be considered to have been enriched with the second component.

Optionally, at least one of the retentate outlet port and the inlet port for the gas mixture is in the first end wall of the housing. Optionally, at least one of the retentate outlet port and the inlet port for the gas mixture is in a side wall of the housing. For example, the retentate outlet port can be provided in the first end wall of the housing (especially approximately centrally in the first end wall of the housing) and the inlet port for the gas mixture can be provided in the side wall of the housing (especially adjacent to the first end of the housing).

The direction of flow through the passageway will depend on whether the port with which the passageway communicates is the gas inlet port or the retentate outlet port. When the gas flowing along the passageway is flowing towards the retentate outlet port, the mass flow of the gas will be less compared with the mass flow that would flow along the passageway from the gas inlet port (under similar operating conditions). This is because of the loss from the gas mixture of the permeate gas. A smaller passageway might then be used when requirements placed on it in terms of mass flow of gas are less, allowing more membrane fibres to be incorporated in an insert for a fixed insert size.

When one of the inlet ports and the retentate outlet port is provided centrally on the first end wall of the housing, the other of inlet port and the retentate outlet port can be provided a side wall of the body portion of the housing. The port that is provided in a side wall of the body portion can be at or close to the first end of the housing, for example substantially immediately adjacent to the first end wall of the housing.

The permeate outlet port can be provided on a side wall of the body portion the housing. The location of the permeate port along the length of the housing can be selected to suit the requirements of a particular application. For example, it might be preferred that the permeate outlet port is located at or close to the second end of the housing, or part way along the length of the housing. Frequently, it will be preferred that the permeate outlet port is located at or close to the first end of the housing. This can facilitate the formation of connections to multiple devices in parallel in a manifold arrangement.

Providing one of the inlet port and the retentate outlet port on the first end wall of the housing and the other of the inlet port and the retentate outlet port on a side wall of the housing can facilitate the formation of connections to multiple devices in parallel in a manifold arrangement, especially when that port is provided at or close to the first end of the housing. The formation of connections to multiple devices in parallel in a manifold arrangement can be further facilitated by providing the permeate outlet port on a side wall of the body portion of the housing, especially when that port is also provided at or close to the first end of the housing.

Seals should be provided to minimise (ideally, to prevent) mixing of any or all of the inlet gas mixture, the permeate, and the retentate. A seal can be provided between the passageway in the insert and whichever of the inlet port and the retentate outlet port it is that the passageway communicates with. Each seal might be provided by an O-ring, for example. For example, when the passageway is provided by a tube which is received within a socket provided in the port, the tube can have an O-ring or other seal on its external surface. Alternatively, or in addition, an O-ring or other seal might be provided within the socket. When the passageway provides a socket in which a tube provided by the port is received, an O-ring or other seal can be provided within the socket, or an O-ring or other seal can be provided on the external surface of the tube.

A seal can be provided between the insert and the internal wall of the housing towards the first end of the housing to seal the space at the first end of the housing between the end of the insert and the first end wall. The seal can be provided by an O-ring on the insert which can engage an annular seat on the internal wall of the housing, especially a seat which is on the internal side wall of the housing. This seal can help to minimise (ideally, prevent) mixing of the permeate which has permeated the material of the fibres with whichever of the inlet gas mixture and the retentate is in the space at the first end of the housing.

A seal can be provided between the insert and an internal surface of the body portion of the housing towards the second end of the housing. The seal can be provided by an O-ring on the insert which can engage an annular seat on the internal wall of the housing, especially a seat which is on the internal side wall of the housing. This seal can help to minimise (ideally, prevent) mixing of the permeate which has permeated the material of the fibres with whichever of the inlet gas mixture and the retentate is in the space defined by the end cap at the second end of the housing which communicates with the ends of the fibres at the second end. The seal between the insert and an internal surface of the body portion of the housing can be arranged so that it is made when the insert is positioned in the body portion of the housing.

A seal can be provided between the insert and the end cap. The seal can be provided by an O-ring on the insert which can engage an annular seat on the internal wall of the housing, especially a seat which is on the internal side wall of the end cap. This seal can help to minimise (ideally, prevent) mixing of the permeate which has permeated the material of the fibres with whichever of the inlet gas mixture and the retentate is in the space defined by the end cap at the second end of the housing which communicates with the ends of the fibres at the second end. The seal between the insert and the end cap can be arranged so that it is made when the insert is assembled with the end cap, which will generally be prior to offering the end cap and the insert to the body portion of the housing for assembly of the device.

The device can therefore include an O-ring for forming a seal between the insert and an internal surface of the body portion of the housing at the end of the body portion of the housing immediately adjacent to the end cap, and another O-ring for forming a seal between the insert and the end cap at the end of the end cap immediately adjacent to the body portion of the housing. These seals can be provided on the insert.

An advantage of providing one or more of the seals on the insert is that the seals can then be replaced conveniently when the insert is removed from the housing, especially when the insert is being replaced with a new or otherwise different insert.

The device can have a central axis, with the passageway extending along the central axis of the device. The device can be elongate so that its length measured along its central axis is greater than its transverse dimension (which will be its diameter when the device is circular when viewed in cross-section).

Advantages of the invention arise from the fact that the insert is fastened to the end cap at least temporarily so that the insert is withdrawn from within the body portion of the housing when the end cap is separated from the body portion. The insert and the end cap can have mating formations by which they can be connected to one another, at least temporarily. For example, the insert and the end cap can have mating bayonet formations by which the insert and the end cap can be fastened to one another. The insert and the end cap can have mating threads by which the insert and the end cap can be fastened to one another. The insert and the end cap might be connected to one another in such a way that they cannot readily be separated. For example, the insert and the end cap might be bonded to one another, for example by means of a third material (such as an adhesive) or without use of a third material (such as by means of a weld).

The insert and the body section might include mating formations by which they can be connected to one another when the insert is positioned in the body section. Mating formations on the insert and the body section can make more secure a seal between the insert and the body section. A connection between the insert and the body section can contribute to the security of the connection between the end cap and the body section. A connection between the insert and the body section can enable the insert to reinforce the housing so that it is better able to withstand the internal pressure and other forces (for example due to vibration) that it is exposed to during use. Mating formations on the insert and the body section might be for example threads or bayonet formations.

The relative lengths of the end cap and the body portion of the housing depend on the location along the length of the housing of the interface between the end cap and the body portion. It will often be preferred that the end cap is relatively short, and the body portion is relatively long. This allows the permeate outlet on the body portion to be located towards the second end of the housing if this might be seen as desirable for a particular application. It can also have the advantage that the portion of the housing which is detached with the insert from the remainder of the housing is relatively small and therefore light. Furthermore, locating the interface is close to the second end of the housing can facilitate access to the interface between the end cap and the body portion, for example in order to loosen fasteners which are located at the interface. Accordingly, the ratio of the length of the body portion of the housing to the length of the end cap and body portion of the housing when they are fastened to one another can be at least about 0.7, optionally at least about 0.8, especially at least about 0.9.

The materials used to make the housing are known from existing gas separation devices. They should be sufficiently robust to withstand the conditions to which they will be exposed during installation and use. In particular, the materials should be chosen so that the housing can withstand the pressure differential across its wall, and other forces to which it is exposed during use such as forces arising from vibration. It will often be preferred that the same material is used to form the body portion and the end cap of the housing. The housing might be made from one or more polymeric materials. Polymeric materials might be reinforced by means of filler material, for example in the form of fibres. The housing might be made from one or more metallic materials, such as aluminium and aluminium alloys. Housing parts might be made by techniques such as casting or machining or 3D printing. Manufacture of parts by machining can be preferred for some applications.

The construction of the housing can be such that it is by itself capable of withstanding the pressure differential across its wall. It might be preferable for some applications for components within the housing to reinforce the housing, enhancing its ability to withstand the pressure differential across its wall and other forces. For example, connections between the insert (especially the ends of a tube which provides the passageway in the insert) and the end cap and body portion of the housing can help to reinforce the housing.

The end cap and the body portion should be capable of being fastened to one another in such a way that the connection between them is sealed against flow of fluid into and out of the housing. A suitable arrangement for fastening the end cap and the body portion to one another can be provided by a flange on the end cap and a facing flange on the body portion. Each of the flanges can have a plurality of openings (for example at least four openings) extending through it. The openings in the flanges can be aligned so that a fastener can be inserted into each pair of aligned openings in the flanges on the end cap and the body portion. The openings on the end cap or the openings on the body portion can be threaded so that a threaded fastener can engage the threaded openings to draw the end cap and the body portion together. It can be particularly preferred to use captive screw fasteners which are retained in the openings in the flange of one of the housing parts and engage threads in the openings in the flange of the other housing part. Other fastening arrangements might be used, such as for example one or more flange clamps or other types of couplings.

The materials used to make the insert are known from existing gas separation devices. An example of a material which is known for use in hollow gas-separation fibre membranes is poly(phenylene oxide). The fibre membrane comprises a permeable sponge-like structure with a dense 40 nm cover layer. A bundle of several thousand such hollow fibres is fixed at both ends using a curable polymer (such as an epoxy) within a metal end fitting. An example of such an insert is sold for use in an aerospace application for reducing the oxygen content of air entering a fuel tank. It is sold by Parker Hannifin Manufacturing Netherlands (Filtration and Separation) B V of Etten-Leur, Netherlands. Gas separation devices of this general kind are also known for use in a variety of other applications, including in oil and gas treatment industries, food and beverage packaging and storage, and pneumatic tyre inflation. They are available from Parker Hannifin and from other sources.

The performance of the insert can be optimised by use of fibres whose lengths are closely matched. This can be facilitated by use of fibres which are straight. Variation in the pressure drop along the lengths of the fibres can be minimised if their lengths are closely matched.

The gas separation device of the invention can be used to separate components of a gas mixture where the permeability of the material of the fibres of a first component of the gas mixture is different from that of a second component of the mixture. A device according to the invention might be configured to separate components of ambient air. When ambient air (consisting primarily of nitrogen and oxygen) is passed through such a device, other gases such as water vapour, hydrogen, helium, carbon dioxide and other trace gases pass through the wall of the fibres, together with oxygen, so that the retentate is rich in nitrogen and the permeate is rich in oxygen. The retentate can be referred to as nitrogen enriched air (NEA) and the permeate can be referred to as oxygen enriched air (OEA).

As is known, the extent to which the permeate gas components are removed from the retentate can be selected by varying the rate of flow of the gas mixture through the device. A slower flow rate allows greater separation of the components of the gas mixture. For example, the nitrogen content of the permeate in an air separation device might be varied between 95% when operating at 5000 N·m$^3$·h$^{-1}$ and 99.9% when operating at 0.5 N·m$^3$·h$^{-1}$.

The invention allows an insert within the housing of a gas separation device to be replaced, leaving the housing in place and connections to the device for the gas mixture inlet port and the retentate outlet port intact. It can be preferred for the insert to include a shroud which covers the fibres over at least a portion of the length of the insert. The shroud can help to protect the fibres from damage when the insert is not in the housing. The shroud can be made from materials such as polymers and metals. The physical properties of the material of the shroud should be such that the shroud can protect the fibres. Preferably the wall thickness of the shroud is small so that the shroud is light and that the space taken by the shroud is small. The wall thickness of a suitable shroud might for example be not more than about 0.5 mm, or not more than about 0.2 mm. An example of a suitable material for the shroud is a sheet made from a metal such as aluminium or an aluminium alloy, or from a polymeric material. The shroud can extend over most of the length of the insert to protect the fibres. Openings can be provided in the shroud to allow for escape of the permeate gas for discharge from the device through the permeate outlet port. Openings in the shroud can be particularly appropriate when the shroud extends along the full length of the fibres in the insert. Openings can be provided at the point along the length of the insert so that they are close to, especially adjacent to, the permeate outlet port when the insert is located within the housing. Openings might therefore be provided at or close to one end of the insert when the permeate outlet port is located at or close to an end of the housing. Openings might be provided in an array extending around the insert. Openings might be provided preferentially adjacent to the permeate outlet port relative to the side of the insert opposite to the permeate outlet port, when the insert is located within the housing.

As is known, the size of the device can be selected according to the requirements of a particular application, including gas throughput, gas purity, available space, the ease with which the device can be serviced, and so on. The length of the device can be varied to provide more separation capacity in order to obtain greater gas throughput or greater gas purity or both. For example, the length of the device might be at least about 30 cm. The length of the device might be up to about 2 m or more. The transverse dimension of the device (which will be its diameter when the device is circular when viewed in cross-section) can be also be varied to provide more separation capacity in order to obtain greater gas throughput or greater gas purity or both. Variation in the transverse dimension of the device will frequently involve varying the number of fibres in the insert. The diameter of a device with a circular cross-section might be at least about 10 cm.

The diameter of a device might be up to about 30 cm or more.

The invention also provides an insert for use in a device for separating components of a gas mixture which comprises:
a. a first end fitting,
b. a second end fitting opposite to the first end fitting,
c. a plurality of hollow fibres made from a material which is more permeable to a first component of the mixture than it is to a second component of the mixture, in which the fibres extend along the insert between the first and second end fittings,
d. a tube which extends along the insert between the first and second ends, the tube extending beyond the first end fitting to define a spigot portion,
e. a first circumferential seal on the outside of the spigot portion of the tube which can form a seal when the spigot portion is received within a socket,
f. a second circumferential seal on the outside of the first end fitting,
g. third and fourth circumferential seals on the outside of the second end fitting,
h. mechanical connection features on the second end fitting.

The device provided by the invention can be useful to prepare nitrogen-enriched air for supply to a fuel tank.

Figure 2:
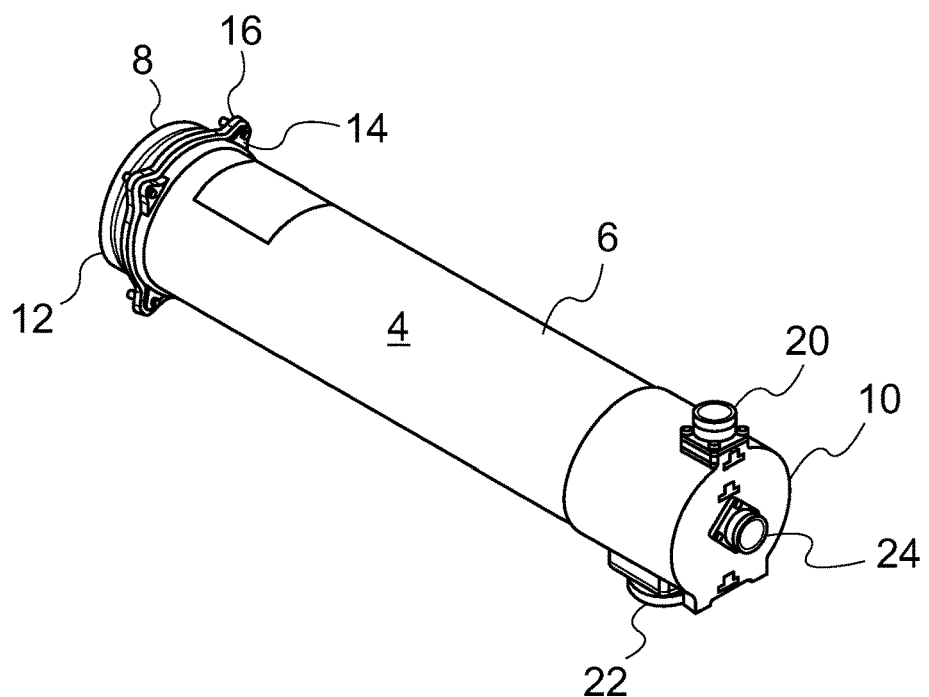
Figure 3:
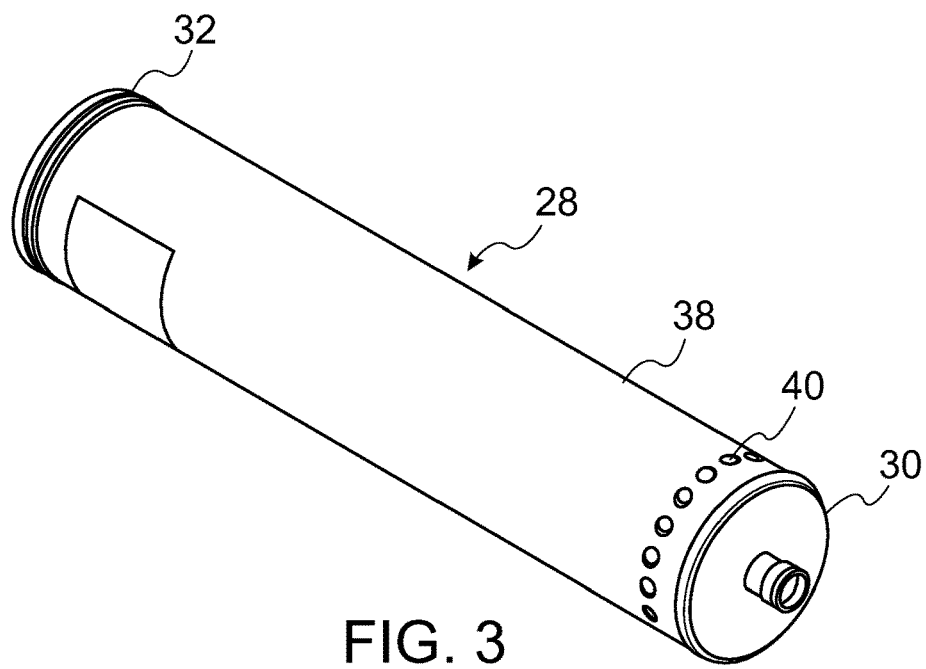
Figure 4:
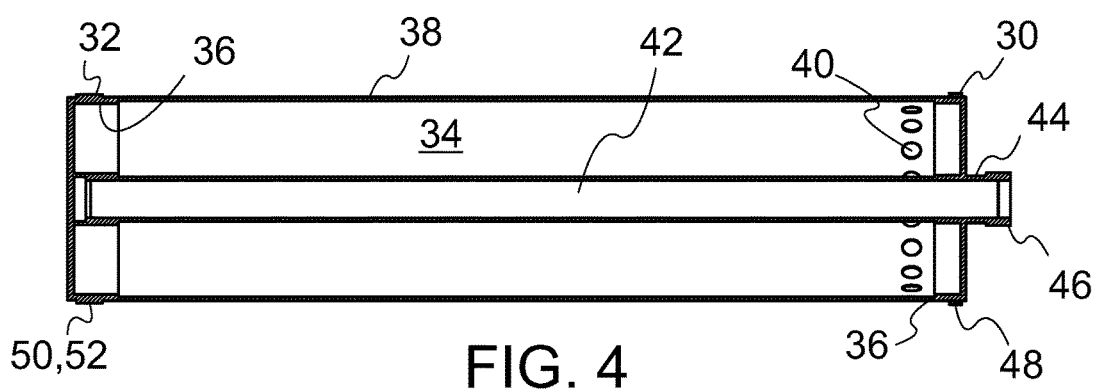
Figures 5, 6:
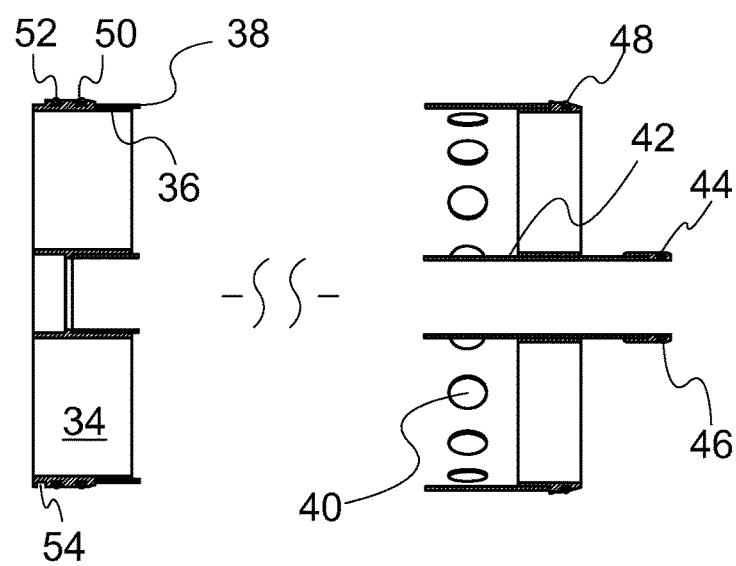
Figure 7:
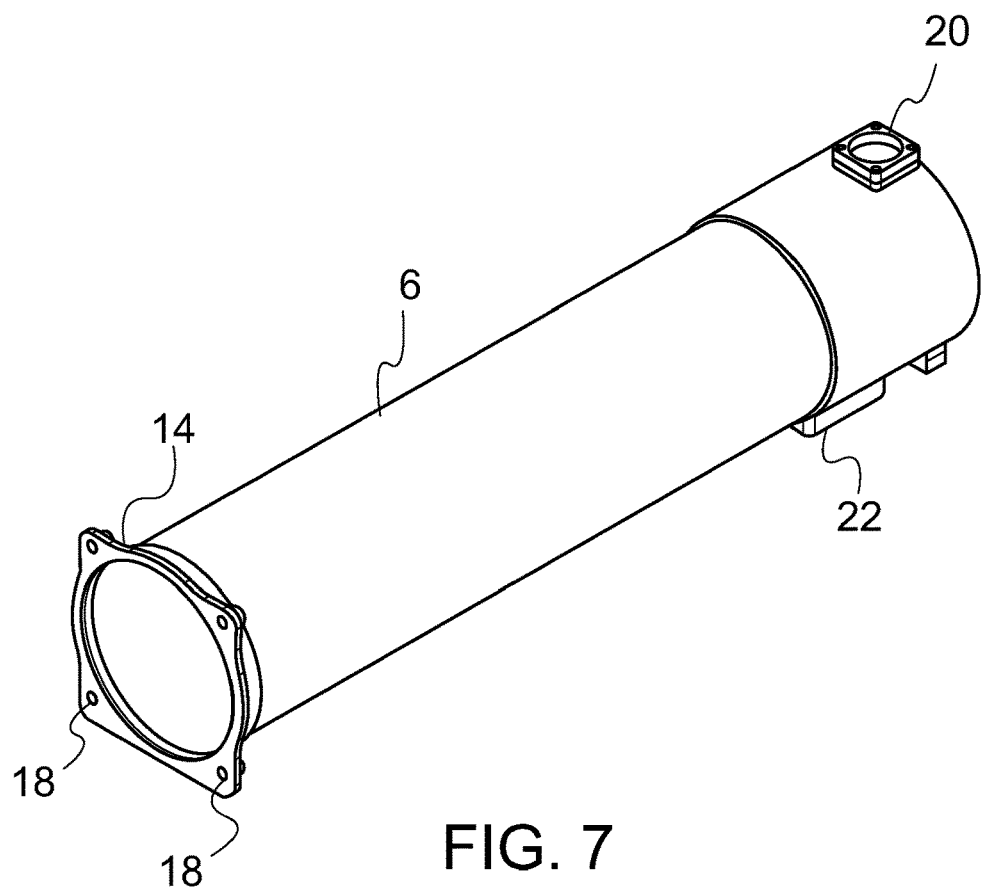
Figure 8:
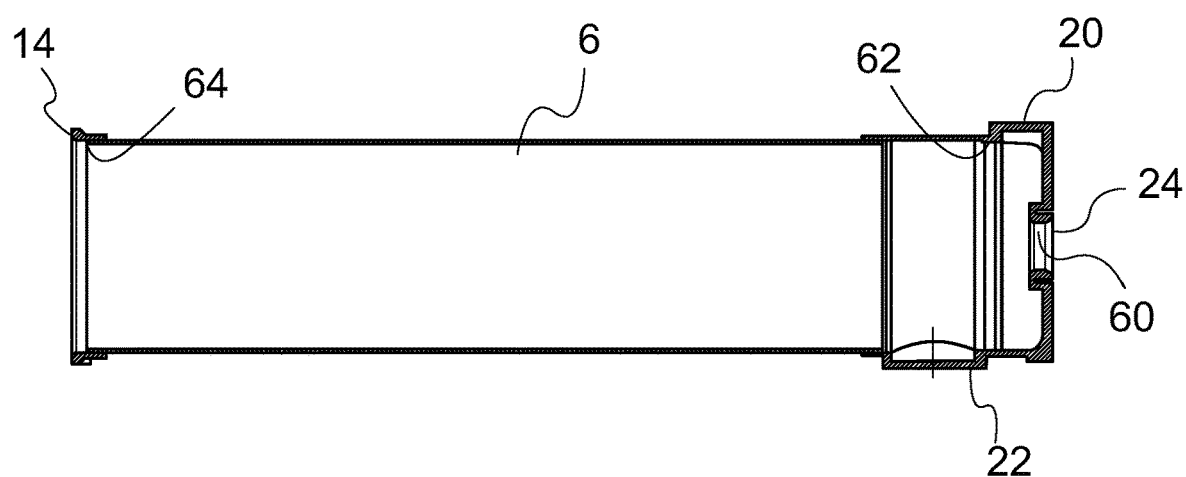
Figure 9:
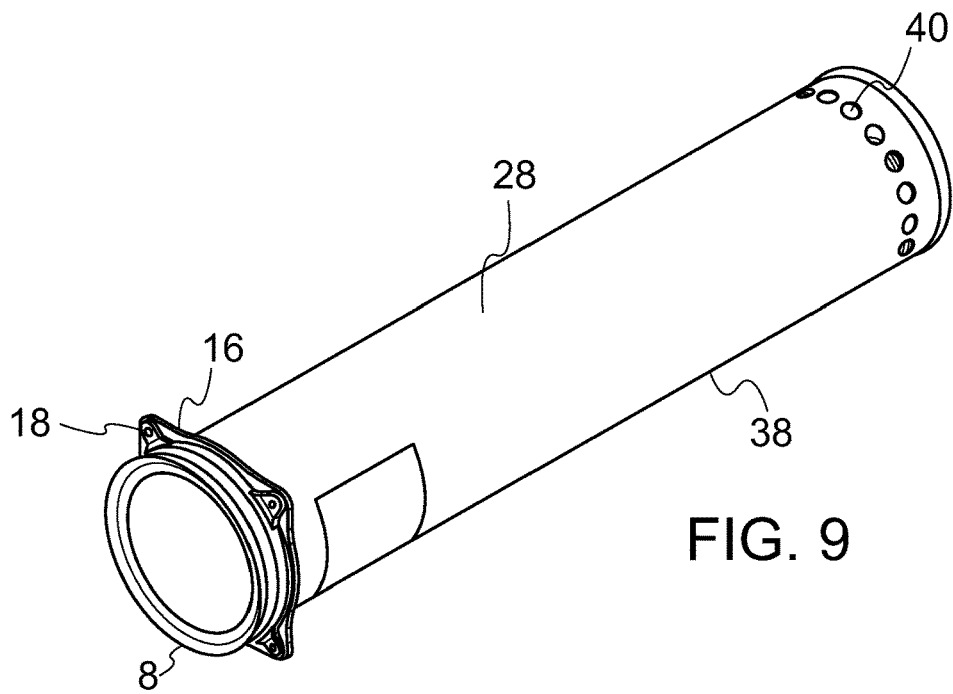
Figure 10:
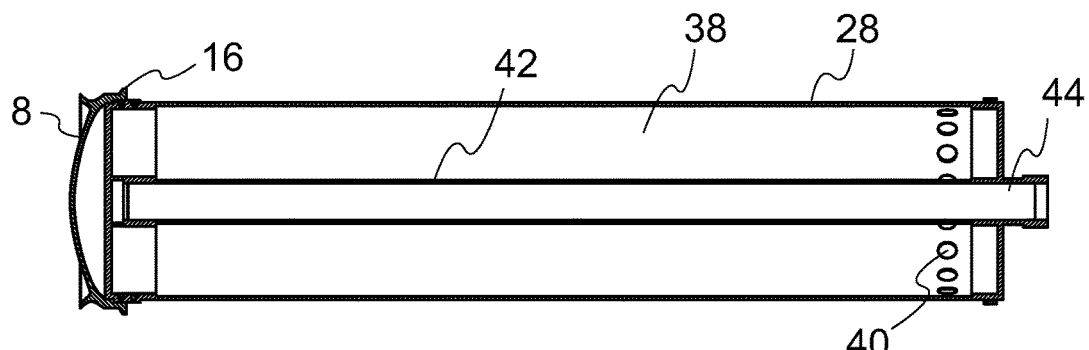
Figure 11:
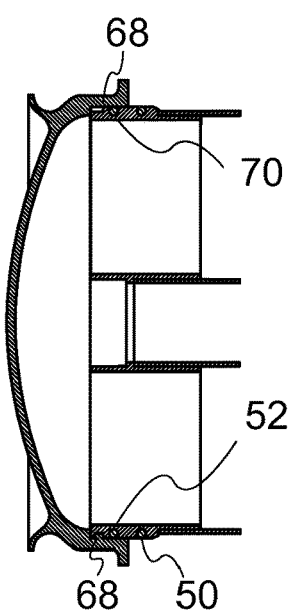
Figure 12:
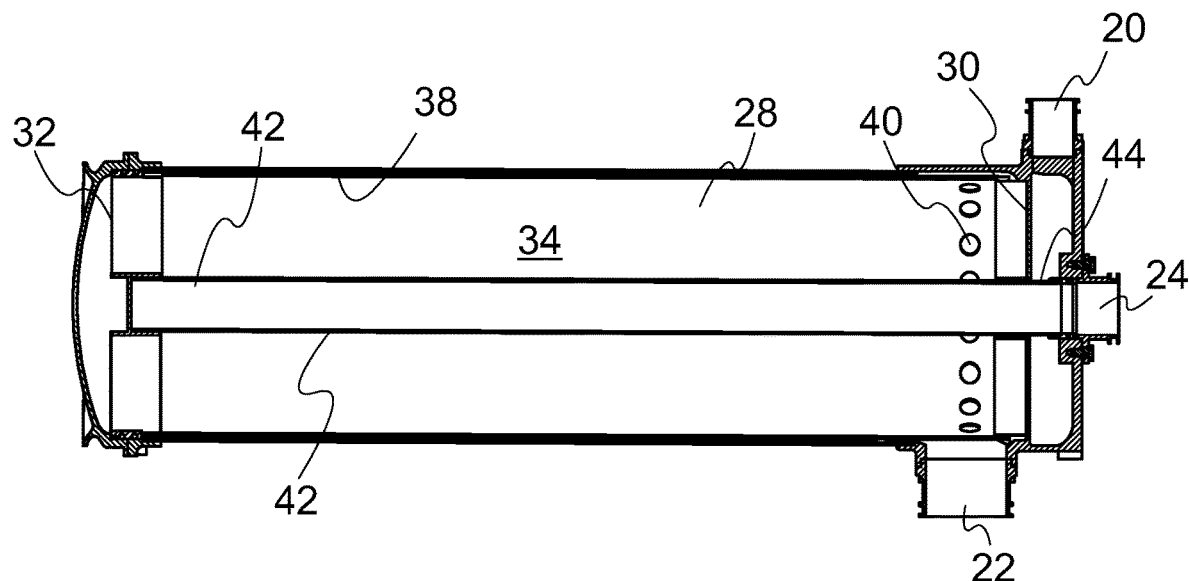
Figure 13:
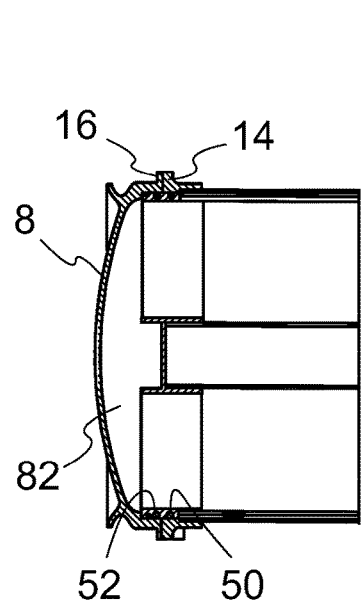
Figure 14:
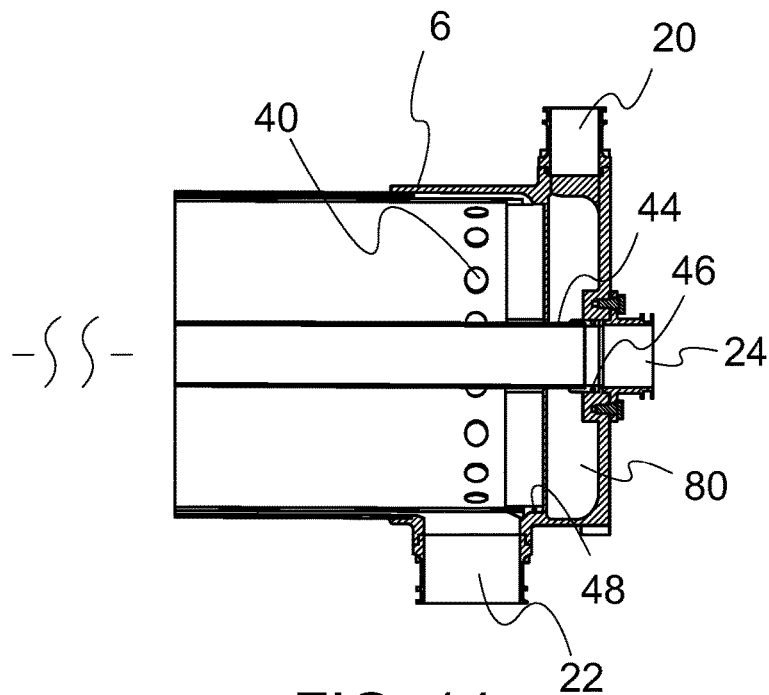

The invention is described below by way of example with reference to the accompanying drawings, in which:
i. FIGS. 1 and 2 are isometric views of a device for separating components of a gas mixture according to the invention, showing the second end and the first end respectively.
j. FIGS. 3 and 4 are an isometric view and a sectional elevation (both schematic) of an insert for use in the device shown in FIGS. 1 and 2.
k. FIGS. 5 and 6 are magnified schematic cross-section views of end portions of the insert shown in FIG. 4.
l. FIGS. 7 and 8 are an isometric view and a cross-section view of the body portion of a housing for use in the device shown in FIGS. 1 and 2.
m. FIGS. 9 and 10 are an isometric view and a sectional elevation of the end cap of a housing for use in the device shown in FIGS. 1 and 2, connected to an insert as shown in FIGS. 3 to 6.
n. FIG. 11 is an enlarged sectional elevation of the end cap and the insert as shown in FIGS. 9 and 10.
o. FIG. 12 is a sectional elevation of the device for separating components of a gas mixture, shown in FIGS. 1 and 2, in which an insert as shown in FIGS. 3 to 6 is assembled in a housing provided by the body portion shown in FIGS. 7 and 8 and the end cap shown in FIGS. 9 to 11.
p. FIGS. 13 and 14 are enlarged sectional elevations of end portions of the assembly shown in FIG. 12.

Referring to the drawings, FIGS. 1 and 2 show a device 2 for separating components of a gas mixture. It might be used to separate nitrogen and oxygen in compressed air that is fed to it. FIGS. 1 and 2 show the external view of the device in which its housing 4 is visible. The housing has a body portion 6 and an end cap 8. The housing has a first end 10 which is provided by the body portion and a second end 12 which is provided by the end cap 8. The ratio of the length of the body portion of the housing to the overall length of the housing (the end cap and body portion when they are fastened to one another) is more than 0.9, so that the length of the end cap is much smaller than the overall length of the complete housing.

Each of the body portion and the end cap has a flange 14, 16 towards its end at which the body portion and end cap are fastened to one another. A gasket can be positioned between the flanges 14, 16 so that the connection between the body portion and the end cap is sealed against flow of gas out of the housing. Each of the flanges has four openings 18 extending through it. More than four openings could be provided if desired. The openings in the flanges are configured to receive threaded fasteners by which the body portion and end cap are fastened to one another.

The body portion has three ports at its first end. A gas inlet port 20 is provided on a side wall of the body portion immediately adjacent the end wall of the body portion which provides the first end 10 of the housing. A permeate outlet port 22 is provided on the side wall of the body portion opposite to the gas inlet port. The permeate outlet port 22 is spaced from the first end wall of the body portion so that it does not overlap axially with the gas inlet port. A retentate outlet port 24 is provided in the end wall of the body portion which provides the first end 10 of the housing. The retentate outlet port is located centrally on the end wall.

FIGS. 3 to 6 show an insert 28 which can be used in the device shown in FIGS. 1 and 2 to separate components of a gas mixture. The insert has first and second end fittings 30, 32. Hollow fibre membranes 34 extend between the end fittings. The hollow fibre membranes are shown schematically in the drawings, represented by solid lines which represent the ends of the fibres. The bores of the fibres are open at their ends for fluid flow along the lengths of the fibres. The membranes have a wall of a permeable, porous material. The ends of the fibres are fitted into troughs 36 provided in each of the end fittings. Spaces between the end portions of the fibres within each of the troughs are impregnated with a curable resin such as an epoxy. The bores defined by the fibres remain free of the resin. This can be achieved by impregnating the fibres within the troughs with a resin, and then cutting away the tips of the fibres. The number of fibres in the insert will depend on the size of the insert and the size of the membranes. The number of fibres will usually be maximised according to the capacity of the troughs in the end fittings. The ends of the fibres are exposed at the end walls of the insert so that gas can flow into the fibres at one end of the insert and out of the fibres at the opposite end of the insert. Techniques for assembling hollow fibre membranes in end fittings using a curable resin, so that the ends of the fibres are exposed for gas flow, are in use in commercial products such as gas separation devices which can be obtained from Parker Hannifin Manufacturing Netherlands (Filtration and Separation) B V of Etten-Leur, Netherlands.

The insert has a shroud 38 which can be formed from a metal or polymer sheet. It extends between the end fittings 30, 32. It has a line of openings 40 formed in it towards the first end fitting 30, extending circumferentially around the insert.

The insert has a passageway defined by a tube 42 which extends along the axis of the insert between the end fittings, with the membrane fibres extending approximately parallel to the tube and arranged around the tube. It will be understood that the fibres might not extend exactly parallel to the tube: for example, there might be some curvature in the fibres, or they might extend helically along the tube. The tube 42 has a spigot portion 44 extending beyond the first end fitting. A groove 46 extends circumferentially around the spigot portion of the tube towards the free end of the spigot portion. An O-ring is provided in the groove.

A groove 48 extends circumferentially around the first end fitting on the insert. An O-ring is provided in the groove.

First and second grooves 50, 52 extend circumferentially around the second end fitting on the insert. O-rings are provided in the grooves.

Bayonet features 54 (slots and flanges as are widely known) are formed in the second end fitting on the insert at the second end of the insert.

FIGS. 7 and 8 show the body portion 6 of the housing 4, with its flange 14 at its second end having openings 18 for receiving threaded fasteners and with the gas inlet port 20, the permeate outlet port 22, and the retentate outlet port 24 at its first end, all as discussed above.

The retentate outlet port 24 is sized to receive the spigot portion 44 of the tube 42 in the insert when the insert is positioned in the body portion of the housing. The outlet port has a seat 60 within it for engaging the O-ring in the groove 46 on the spigot portion.

As mentioned above, the permeate outlet port 22 is spaced from the first end wall of the body portion so that it does not overlap axially with the gas inlet port. A seat 62 is provided in the internal wall of the body portion, axially between the gas inlet port and the permeate outlet port. The seat extends circumferentially around the internal wall of the body portion, for engaging the O-ring in the groove 48 which extends circumferentially around the first end fitting on the insert when the insert is positioned in the body portion of the housing.

A seat 64 is provided in the internal wall of the body portion at its open end, closely adjacent to the flange 14. The seat extends circumferentially around the internal wall of the body portion for engaging the O-ring in the first groove 50 which extends circumferentially around the second end fitting on the insert when the insert is positioned in the body portion of the housing.

FIGS. 9 to 11 show the insert 28 which is discussed above with reference to FIGS. 3 to 6 connected to the end cap 8 of the housing. The end cap can be formed from an aluminium alloy. As discussed above, it has a flange 16 having openings 18 for receiving threaded fasteners by which it can be connected to the body portion 6 of the housing.

The end cap has bayonet features 68 formed in its internal surface which can engage the corresponding bayonet features 54 formed in the second end fitting on the insert, to connect the end cap to the insert at the second end of the insert. The end cap and the insert are shown with the bayonet features on the two components engaged in FIGS. 9 to 11.

A seat 70 is provided in the internal wall of the end cap at its open end, closely adjacent to the flange 16. The seat extends circumferentially around the internal wall of the end cap for engaging the O-ring in the second groove 52 which extends circumferentially around the second end fitting on the insert when the end cap is fastened to the insert. The flange bayonet features provided on the end cap or the insert or both can be provided as inclined ramps so that the end cap and the insert are drawn together as one is rotated relative to the other, causing compression of the O-ring in the second groove 52.

FIGS. 12 to 14 show the assembled device of FIG. 1 in which an insert 28 is positioned within the housing 4 with the end cap 8 fastened to the body portion 6 by means of captive bolt fasteners in the aligned openings 18 in the flanges 14, 16 on the body portion and end cap.

The device is assembled by connecting the insert to the end cap using the mating bayonet features 54, 68 on the insert and the end cap (so that they are as shown in FIGS. 9 to 11). By arranging the bayonet features slightly inclined relative to a plane which is perpendicular to the axis of the device, the insert is drawn into the end cap as the bayonet features engage. This causes the O-ring in the second groove 52 at the second end of the insert to be drawn into sealing engagement with the seat 70 in the internal wall of the end cap.

The insert is slid into the body portion 6 of the housing so that the spigot portion 44 of the tube 42 is received in the retentate outlet port 24 and the O-ring in the groove 46 on the spigot portion engages the seat 60 within the outlet port. The O-ring in the groove 48 which extends circumferentially around the first end fitting on the insert then engages the seat 62 which extends circumferentially around the internal wall of the body portion. The O-ring in the groove 50 which extends circumferentially around the second end fitting on the insert engages the seat 64 which extends circumferentially around the internal wall of the body portion.

When the insert is slid into the body portion so that the O-rings engage their respective seats, a first space 80 is formed at the first end of the device, between the end of the insert and the first end of the housing. The gas inlet port 20 and the ends of the fibres 34 communicate with the first space 80. The first space 80 is isolated from the permeate outlet port by means of the O-ring in the groove 48 on the first end fitting of the insert. The first space 80 is isolated from the retentate outlet port by means of the O-ring in the groove 46 on the spigot portion 40 of the tube.

When the insert is slid into the body portion so that the O-rings engage their respective seats, a second space 82 is formed at the second end of the device, between the end of the insert and the second end of the housing. The end of the tube 42 at the second end of the insert and the ends of the fibres 34 communicate with the second space 82.

The openings 40 in the shroud 38 are located at the same position along the length of the housing as the permeate outlet port 22 when the insert is slid into the body portion, so that the openings are immediately adjacent to the outlet port.

The insert is held in place within the housing when the end cap and the body portion of the housing are fastened to one another by means of threaded fasteners inserted into the openings 18 in the flanges 14, 16.

When the device is in use, a gas mixture is supplied to the device through the inlet port 20. The gas mixture flows into the first space 80 between the end of the insert and the first end of the housing and into the hollow membrane fibres 34 of the insert 28. Separation of components of the gas mixture is then achieved by one or more components (the "permeate components") passing selectively through the walls of the fibres while one or more other components (the "retentate components") pass along the fibres to be discharged at the second ends of the fibres into the second space 82 between the end of the insert and the second end of the housing. The retentate components then flow from the second space 82 along the tube 42 to the retentate outlet port 24.

The device may be capable of being arranged so that the gas mixture flows in a different direction through the device, which may be considered to be a reverse or opposite direction. In this situation, the gas mixture to be treated flows into the port 24 (which acts as an inlet port), passing along the tube 42 to the second space 82. The gas mixture then flows into the hollow membrane fibres 34 of the insert 28, separation of components of the gas mixture being achieved by permeate components passing selectively through the walls of the fibres while retentate components pass along the fibres to be discharged at the first ends of the fibres into the first space 80. The retentate components then flow from the first space 80 to the port 20 (which acts as a retentate outlet port).

The device facilitates replacement of the insert 28 without the need to disturb the connections between the device and conduits for the untreated gas mixture, the retentate output gas, and optionally also the permeate output gas. Replacement of the insert can be achieved by disengaging the threaded fasteners from the threads in the openings in flanges on the body part and end cap of the housing. The end cap can then be separated from the body part. A connection between the end cap and the insert means that the insert is withdrawn from the body part of the housing when the end cap is separated from the body part.

The end cap can be separated from a used insert by rotating (usually anti-clockwise) the insert relative to the bayonet, to disconnect the bayonet features on the end cap and the insert. The device can then be reassembled using a new insert.

Replacement of the insert within the device of the invention without disturbing connections between the device and the conduits for the untreated gas mixture, the retentate output gas, and the permeate output gas has the advantage that it takes less time compared with devices which have to be replaced in their entirety (housing and insert) after separation from their conduits. It also means that the device can be serviced even when it is installed in locations in which access to the connections to conduits for the untreated gas mixture, the retentate output gas, and the permeate output gas is restricted.

The invention claimed is:

1. A device for separating components of a gas mixture, the device comprising:
   a. a hollow housing having a first end wall at a first end, a second end wall at a second end opposite to the first end, and at least one side wall, in which the housing has a body portion which provides the first end, and an end cap which provides the second end and can be separated from the body portion to allow access to the interior of the body portion, and in which the housing has (a) an inlet port for the gas mixture, (b) a permeate outlet port for gas mixture which is enriched with a first component of the mixture, and (c) a retentate outlet port for gas mixture which is enriched with a second component of the mixture, and the inlet port, the permeate outlet port and the retentate outlet port are provided in the body portion of the housing,
   b. an insert located within the housing, the insert comprising a plurality of hollow fibres of a material which is more permeable to the first component of the mixture than to the second component of the mixture, in which the fibres extend along the insert between a first and second end of the insert,
   in which the housing defines a space at the housing first end which communicates with first ends of the fibres at the first end of the insert, and the insert defines at least one passageway for gas to flow between second ends of the fibers at the second end of the insert and the retentate outlet port for the gas mixture to flow from the space to the retentate outlet port,
   and in which the insert is fastened to the end cap at least temporarily so that the insert is withdrawn from within the body portion of the housing from the second end when the end cap is separated from the body portion.

2. The device as claimed in claim 1, in which the permeate outlet port is provided in the body portion adjacent to the first end of the housing.

3. The device as claimed in claim 2, in which the permeate outlet port is in a side wall of the body portion of the housing.

4. The device as claimed in claim 1, in which at least one of the retentate outlet port and the inlet port for the gas mixture is in the first end wall of the housing.

5. The device as claimed in claim 1, in which at least one of the retentate outlet port and the inlet port for the gas mixture is in a side wall of the housing.

6. The device as claimed in claim 1, further including a first seal between the insert and an internal surface of the housing towards the first end of the housing.

7. The device as claimed in claim 6, further including a second seal between the passageway and the first end wall of the housing at the said one of inlet port and the retentate outlet port.

8. The device as claimed in claim 7, further including a third seal between the insert and an internal surface of the body portion of the housing towards the second end of the housing.

9. The device as claimed in claim 8, further including a fourth seal between the insert and the end cap.

10. The device as claimed in claim 7, further including (a) a third seal between the insert and an internal surface of the body portion of the housing at the end of the body portion of the housing immediately adjacent to the end cap, and (b) a fourth seal between the insert and the end cap at the end of the end cap immediately adjacent to the body portion of the housing.

11. The device as claimed in claim 1, wherein the device has a central axis, with the passageway extending along the central axis of the device.

12. The device as claimed in claim 1, in which the insert and the end cap have mating bayonet formations by which the insert and the end cap can be fastened to one another.

13. The device as claimed in claim 1, in which the insert and the end cap have mating threads by which the insert and the end cap can be fastened to one another.

14. The device as claimed in claim 1, which includes fasteners for fastening the end cap to the body portion of the housing.

15. The device as claimed in claim 1, in which the ratio of i) the length of the body portion of the housing to ii) the length of the end cap and body portion of the housing when they are fastened to one another, is at least about 0.7.

16. An insert for use in a device for separating components of a gas mixture, the insert comprising:
   a. a first end fitting,
   b. a second end fitting opposite to the first end fitting,
   c. a plurality of hollow fibres made from a material which is more permeable to a first component of the mixture than to a second component of the mixture, in which the fibres extend along the insert between the first and second end fittings,
   d. a tube which extends along the insert between the first and second end fittings, the tube extending beyond the first end fitting to define a spigot portion,
   e. a first circumferential seal on an outside of the spigot portion of the tube which can form a seal when the spigot portion is received within a socket,
   f. a second circumferential seal on an outside of the first end fitting located so as to isolate an end of the insert adjacent a permeate outlet port of the device from an inlet port of the device when the insert is located in the device,
   g. third and fourth circumferential seals on an outside of the second end fitting, and
   h. mechanical connection features on the second end fitting.

17. A device for separating components of a gas mixture, the device comprising:
   a. a hollow housing including i) a body portion having a sidewall, a first, closed end at one end of the body portion, and a second, open end at another, opposite end of the body portion, and ii) an end cap, enclosing the second open end of the body portion that can be separated from the body portion to allow access to an interior of the housing, and in which the housing has (a) an inlet port for the gas mixture, (b) a permeate outlet port for gas mixture which is enriched with a first component of the mixture, and (c) a retentate outlet port for gas mixture which is enriched with a second component of the mixture, the inlet port, the permeate outlet port and the retentate outlet port being located in the body portion of the housing; and
   b. an insert located within the housing, the insert comprising a plurality of hollow fibres of a material which is more permeable to the first component of the mixture than to the second component of the mixture, in which the fibres extend along the insert between a first and second end of the insert, in which the housing defines a space at the housing first end which communicates with first ends of the fibres at the first end of the insert, and the insert defines at least one passageway for gas to flow between second ends of the fibers and the retentate outlet port for the gas mixture to flow from the space to the retentate outlet port,
      and in which the insert is fastened to the end cap at least temporarily so that the insert is withdrawn from within the housing from the second end when the end cap is separated from the body portion.

18. The device as claimed in claim 17, in which the permeate outlet port is provided in the body portion adjacent to the first end of the body portion.

19. The device as claimed in claim 18, in which the permeate outlet port is located in the side wall of the body portion of the housing.

20. The device as claimed in claim 19, in which at least one of the retentate outlet port and the inlet port for the gas mixture is in an end wall at the first end of the body portion.

21. The device as claimed in claim 20, in which at least one of the retentate outlet port and the inlet port for the gas mixture is in the side wall of the body portion of the housing.

22. The device as in claim 17, wherein the inlet port and the retentate outlet port for the gas mixture are at the same end of the body portion.

23. The device as in claim 17, wherein the inlet port, the permeate outlet port and the retentate outlet port for the gas mixture are at the first end of the body portion.

24. The device as in claim 18, wherein at least one of the inlet port and the retentate outlet port for the gas mixture is provided in the body portion adjacent to the first end of the body portion.

25. The device as in claim 17, wherein the permeate outlet port, and one of the inlet port and the retentate outlet port, is provided in the body portion at the first end of the body portion, and the other of the inlet port and the retentate outlet port is provided in an end wall at the first end of the body portion.

26. The device as in claim 1, wherein the inlet port and the retentate outlet port for the gas mixture are at the same end of the housing.

27. The device as in claim 1, wherein the inlet port, the permeate outlet port and the retentate outlet port for the gas mixture are at the first end of the housing.

28. The device as in claim 2, wherein at least one of the inlet port and the retentate outlet port for the gas mixture is provided in the body portion adjacent to the first end of the housing.

29. The device as in claim 1, wherein the permeate outlet port, and one of the inlet port and the retentate outlet port, is provided in the body portion at the first end of the housing, and the other of the inlet port and the retentate outlet port is provided in an end wall at the first end of the housing.

30. A device for separating components of a gas mixture, the device comprising:

a. a hollow housing including i) a body portion having a sidewall, a first, closed end at one end of the body portion, and a second, open end at another, opposite end of the body portion, and ii) an end cap, enclosing the second open end of the body portion that can be separated from the body portion to allow access to an interior of the housing, and in which the housing has (a) an inlet port for the gas mixture, (b) a permeate outlet port for gas mixture which is enriched with a first component of the mixture, and (c) a retentate outlet port for gas mixture which is enriched with a second component of the mixture, the inlet port, the permeate outlet port and the retentate outlet port being located in the body portion of the housing; and b. an insert located within the housing, the insert comprising a plurality of hollow fibres of a material which is more permeable to the first component of the mixture than to the second component of the mixture, in which the fibres extend along the insert between a first and second end of the insert, in which the housing defines a first space at the housing first end which communicates with first ends of the fibres at the first end of the insert, and a second space at the housing second end which communicates with second ends of the fibres at the second end of the insert, and the insert defines at least one gas flow passageway between the second space and the retentate outlet port, and in which the insert is fastened to the end cap at least temporarily so that the insert is withdrawn from within the housing from the second end when the end cap is separated from the body portion.

* * * * *